US012790571B2

(12) United States Patent
Wang et al.

(10) Patent No.: US 12,790,571 B2
(45) Date of Patent: Nov. 10, 2026

(54) PRODUCT AND METHOD FOR STABILIZATION/CHILL PROOFING OF FERMENTED LIQUIDS

(71) Applicant: Active Minerals International, LLC, Sparks, MD (US)

(72) Inventors: Bo Wang, Union City, CA (US); Dennis Parker, Victor, ID (US)

(73) Assignee: Active Minerals International, LLC, Sparks, MD (US)

( * ) Notice: Subject to any disclaimer, the term of this patent is extended or adjusted under 35 U.S.C. 154(b) by 1037 days.

(21) Appl. No.: 17/984,051

(22) Filed: Nov. 9, 2022

(65) Prior Publication Data

US 2024/0150686 A1 May 9, 2024

(51) Int. Cl.
*C12C 11/11* (2019.01)
*C12H 1/044* (2006.01)

(52) U.S. Cl.
CPC ............ *C12C 11/11* (2013.01); *C12H 1/0408* (2013.01)

(58) Field of Classification Search
CPC ........ C04B 14/10; C12C 11/11; C12H 1/0408
See application file for complete search history.

(56) References Cited

U.S. PATENT DOCUMENTS 3,424,588 A 1/1969 Dohman
3,940,498 A 2/1976 Butterworth
3,941,718 A 3/1976 Barabas
5,114,894 A 5/1992 Witt
6,207,208 B1 3/2001 Irwin
6,444,601 B1 9/2002 Purcell, Jr. et al.
2002/0164400 A1 11/2002 Berg
2016/0289618 A1 10/2016 Hu et al.
2019/0270067 A1 9/2019 Wang
2021/0115365 A1 4/2021 Riley
2022/0048008 A1 2/2022 Kapralou et al.

FOREIGN PATENT DOCUMENTS

CN 101878731 B 5/2012
GB 1248501 A 10/1971

OTHER PUBLICATIONS

Zhu et al., Effect of Sintering Temperature on the Structure and Properties of Attapulgite-Based Nanofibrous Membranes, Materials Science Forum, vol. 898, Jun. 19, 2017. pp. 1929-1934.

(Continued)

*Primary Examiner* — Bradley R Spies
(74) *Attorney, Agent, or Firm* — Merchant & Gould P.C.

(57) ABSTRACT

A product and method for reducing chill haze in a fermented liquid is disclosed. The product may comprise attapulgite or sepiolite or mixture thereof. The product or the attapulgite or the sepiolite may have a particle size distribution having a $d_{50}$ of 5-19 microns or 10-19 microns. The product or the attapulgite or the sepiolite may have: a pore volume of 0.5-1.9 mL/g or 0.7-1.5; and/or a porosity of 30-90% or 40-80% or 45-75%. The attapulgite or sepiolite or mixture thereof may comprise particles having an intrinsic pore size in the range of 6-50 nm or 10-50 nm or 15-35 nm or 20-30 nm. The product may have a Stabilizing Power of 40-100% at a loading of 20-200 g of the product per HL of fermented liquid.

16 Claims, 3 Drawing Sheets

Feed Material A 500x

(56) References Cited

OTHER PUBLICATIONS

Active Minerals International, Gel Grade Attapulgite, Min-U-Gel 200, May 2014 [retrieved on Dec. 21, 2023]. Retrieved from the internet: <URL: https://www.rbhltd.com/wp-content/uploads/2019/05/Min-U-Ge1-200TDS.pdf>.
International Search report and Written Opinion related to Application No. PCT/US2335889; reported on Feb. 12, 2024.
Elsevier, "Properties and Uses of Bentonite" 1978, pp. 217-248, https://doi.org/10.1016/S0070-4571(08)70615-0.
Haydn H. Murray, "Clays, Uses", Kirk-Othmer Encyclopedia of Chemical Technology, Indiana University, Dec. 20, 2002, https://doi.org/10.1002/0471238961.2119051919051414.a01.pub2.
"Beer gushing" Beer, 2009, pp. 185-212, https://doi.org/10.1016/B978-0-12-669201-3.00006-3.

Feed Material A 500x

Feed Material B 100,000x

Feed Material B 2000x

PRODUCT AND METHOD FOR STABILIZATION/CHILL PROOFING OF FERMENTED LIQUIDS

TECHNICAL FIELD

The present disclosure generally relates to products comprising clay that are suitable for the stabilizing or chill proofing of fermented liquids such as beer, wine, cider, vinegar or the like.

BACKGROUND

Chill haze is generally not desirable for most fermented liquids (e.g., beer) since consumers often perceive haziness as a defect and/or undesirable. Chill haze forms when a fermented liquid is cooled to below 0° C. and, as a result, certain proteins react and agglomerate together. Without treatment, a portion of the chill haze can develop into permanent haze present in the fermented liquid. This is particularly undesirable for beverages and consumable liquids.

Porous silica gels (hydrogels and xerogels) are commonly used in a two-step process to remove proteins responsible for causing haze in beer and other fermented liquids. For example, these silica gels are added to unstabilized beer to bind proteins to the silica structure via a silica gel stabilization reaction. After reaction is completed, the "used" silicate gel particles must then be removed by a filtration process. The slow kinetics of the filtration of silicate gel particles decrease the efficiency of using such products for stabilization and increase the expense of producing beverages such as beer, wine, cider and the like, and other fermented consumables such as vinegar.

US Publication No. 2019/0270067, published Sep. 5, 2019, (the '067 Publication) describes a composite filter aid containing a structured composite material formed by agglomerating a mineral with a protein-adsorbing binder, in which the structured composite material includes a particle of the protein-adsorbing binder bonded to a plurality of particles of the mineral (e.g., diatomaceous earth, natural glass such as perlite). While the disclosure of the '067 Publication may be beneficial, an effective and less expensive removal media is desired that is capable of stabilizing and/or chill proofing liquids.

SUMMARY OF THE DISCLOSURE

In one aspect of the present disclosure, a product for reducing chill haze in a fermented liquid is disclosed. The product may comprise attapulgite or sepiolite. The product or the attapulgite or the sepiolite may have a particle size distribution having a $d_{50}$ of 5-19 microns or 10-19 microns. The product or the attapulgite or the sepiolite may have a pore volume of 0.5-1.9 mL/g or 0.7-1.5 mL/g. The product or the attapulgite or sepiolite may have a porosity of 30-90% or 40-80% or 45-75%. The attapulgite may comprise particles having an intrinsic pore size in the range of 6-50 nm or 10-50 nm or 15-35 nm or 20-30 nm, or the sepiolite may comprise particles having an intrinsic pore size in the range of 6-50 nm or 10-50 nm or 15-35 nm or 20-30 nm. The product may have a Stabilizing Power of 40-100% at a loading of 20-200 g of the product per HL of fermented liquid, or Stabilizing Power of 50-100% at a loading of 30-180 g of the product per HL of fermented liquid, or Stabilizing Power of 40-100% at a loading of 35-100 g of the product per HL of fermented liquid, or Stabilizing Power of 50-100% at a loading of 75-100 g of the product per HL of fermented liquid.

In an embodiment, the attapulgite or sepiolite may have been treated with acetic acid and the product may have a pH in water of 6-8 or 6.5-7.5 or 6.9-7.1 measured in a 2 wt. % slurry.

In any one of the embodiments above, the fermented liquid may be beer and the product may have no more than 1.5 parts per million (ppm) beer soluble iron or may have no more than 1.2 ppm beer soluble iron or may have a beer soluble iron content of 0.1-1.3 ppm, each as measured by the modified ASBC method discussed herein.

In any one of the embodiments above, the fermented liquid may be beer and the product may have a beer Stabilizing Power of 40-100% at a loading of 35-100 g of the product per HL of beer, or beer Stabilizing Power of 50-100% at a loading of 75-100 g of the product per HL of beer.

In any one of the embodiments above, the product or the attapulgite or the sepiolite may have a surface area in the range of 90-130 $m^2/g$ or 90-150 $m^2/g$ as measured using the BET method.

In any one of the embodiments above, the fermented liquid may be a beer, wine, cider or vinegar. wherein the product is free of a composite material that includes: (a) attapulgite agglomerated to a first material that is not attapulgite or sepiolite or (b) sepiolite agglomerated to the first material that is not attapulgite or sepiolite.

In any one of the embodiments above, the fermented liquid may be a beer, wherein the beer is an IPA, Lager or Pilsner.

In any one of the embodiments above, the product may have a ratio of $Al_2O_3$ to $SiO_2$ in the range of 0.17-0.22, a ratio of MgO to $SiO_2$ in the range of 0.12-0.16, and a ratio of MgO to $Al_2O_3$ in the range of 0.75-0.85.

In another aspect of the disclosure, a method of producing a product for reducing chill haze in a fermented liquid is disclosed. The method may comprise heat treating attapulgite and/or sepiolite at a temperature of 200-600° C. or 250-600° C. to produce a heat treated material, wherein, the product comprises the heat treated material. The product or heat treated attapulgite or heat treated sepiolite may have a particle size distribution having a $d_{50}$ of 5-19 microns or 10-19 microns, the product or heat treated attapulgite or heat treated sepiolite may have a pore volume of 0.5-1.9 mL/g or 0.7-1.5 mL/g, the product or heat treated attapulgite or heat treated sepiolite may have a porosity of 30-90% or 40-80% or 45-75%. The heat treated attapulgite may comprise particles having an intrinsic pore size in the range of 6-50 nm or 10-50 nm or 15-35 nm or 20-30 nm or the heat treated sepiolite may comprise particles having an intrinsic pore size in the range of 6-50 nm or 10-50 nm or 15-35 nm or 20-30 nm. The product may have a Stabilizing Power of 40-100% at a loading of 20-200 g of the product per HL of fermented liquid, or Stabilizing Power of 50-100% at a loading of 30-180 g of the product per HL of fermented liquid, or Stabilizing Power of 40-100% at a loading of 35-100 g of the product per HL of fermented liquid, or Stabilizing Power of 50-100% at a loading of 75-100 g of the product per HL of fermented liquid.

In an embodiment, the method may further comprise sizing the attapulgite and/or sepiolite to a particle size distribution that has a $d_{50}$ of 5-19 microns, wherein the sizing comprises agglomeration and/or air classification and/or screening, wherein the fermented liquid includes beer, wine, cider or vinegar.

In an embodiment, the method may further comprise, prior to the heat treating, mixing the attapulgite and/or sepiolite with acetic acid, wherein the heat treating is at a temperature of 300-400° C., wherein the fermented liquid includes beer, wine, cider or vinegar.

In any one of the embodiments above, the product may have a pH of 6-8 or 6.5-7.5 or 6.9-7.1 in a 2 wt. % water slurry.

In any one of the embodiments above, the fermented liquid may be beer, wherein the product may have no more than 1.5 ppm beer soluble iron or may have no more than 1.2 ppm beer soluble iron, as measured by the modified ASBC method, wherein the product may have a beer Stabilizing Power of 40-100% at a loading of 35-100 g of the product per HL of fermented liquid, or beer Stabilizing Power of 50-100% at a loading of 75-100 g of the product per HL of fermented liquid. In a refinement, the beer may be an IPA, Lager or Pilsner.

In any one of the embodiments above, the fermented liquid may be beer, the product may have a permeability of 0.1-1 darcy, and the product may have a beer Stabilizing Power of 40-100% at a loading of 35-100 g of the product per HL of beer, or beer Stabilizing Power of 50-100% at a loading of 75-100 g of the product per HL of beer.

In any one of the embodiments above, the fermented liquid may include beer, wine, cider or vinegar, and the product may be free of: a composite material that includes: (a) attapulgite agglomerated to a first material that is not attapulgite or sepiolite or (b) sepiolite agglomerated to the first material that is not attapulgite or sepiolite, and the product may have a ratio of $Al_2O_3$ to $SiO_2$ in the range of 0.17-0.22, and the product may have a ratio of MgO to $SiO_2$ in the range of 0.12-0.16, and the product may have a ratio of MgO to $Al_2O_3$ in the range of 0.75-0.85.

In yet another aspect of the disclosure, a method for reducing chill haze in a fermented liquid is disclosed. The fermented liquid may include beer, wine, cider or vinegar. The method may comprise: contacting or mixing the fermented liquid with a product comprising heat treated attapulgite or heat treated sepiolite; and recovering the product from the fermented liquid to obtain a resultant fermented liquid that has a lower chill haze or has a lower amount of protein and/or polyphenol than the fermented liquid had prior to the contacting or mixing, wherein the product may have a Stabilizing Power of 40-100% at a loading of 20-200 g of the product per HL of fermented liquid, or Stabilizing Power of 50-100% at a loading of 30-180 g of the product per HL of fermented liquid, or Stabilizing Power of 40-100% at a loading of 35-100 g of the product per HL of fermented liquid, or Stabilizing Power of 50-100% at a loading of 75-100 g of the product per HL of fermented liquid, wherein the heat treated attapulgite may comprise particles having an intrinsic pore size in the range of 6-50 nm or 10-50 nm or 15-35 nm or 20-30 nm or the heat treated sepiolite may comprise particles having an intrinsic pore size in the range of 6-50 nm or 10-50 nm or 15-35 nm or 20-30 nm, wherein the product or the heat treated attapulgite or the heat treated sepiolite may have a particle size distribution having a $d_{50}$ of 5-19 microns or 10-19 microns, wherein the product or the heat treated attapulgite or the heat treated sepiolite may have (a) a pore volume of 0.5-1.9 mL/g or 0.7-1.5 mL/g, wherein the product or the heat treated attapulgite or heat treated sepiolite may have a porosity of 30-90% or 40-80% or 45-75%.

In an embodiment, the fermented liquid may be beer, wherein the beer may be an IPA, Lager or Pilsner. The product may have a beer Stabilizing Power of 40-100% at a loading of 35-100 g of the product per HL of beer, or beer Stabilizing Power of 50-100% at a loading of 75-100 g of the product per HL of beer. In a refinement, the product may have a pH of 6-8 or 6.5-7.5 or 6.9-7.1, as measured in a 2 wt. % water slurry, wherein the product has no more than 1.5 ppm beer soluble iron or has no more than 1.2 ppm beer soluble iron, each as measured by the modified ASBC method. In another refinement of the embodiment, the product may have a permeability of 0.1-1 darcy in water, the product may be free of a composite material that includes: (a) attapulgite agglomerated to a first material that is not attapulgite or sepiolite or (b) sepiolite agglomerated to the first material that is not attapulgite or sepiolite, and the product may have a ratio of $Al_2O_3$ to $SiO_2$ in the range of 0.17-0.22, and the product may have a ratio of MgO to $SiO_2$ in the range of 0.12-0.16, and the product may have a ratio of MgO to $Al_2O_3$ in the range of 0.75-0.85.

DETAILED DESCRIPTION

Figure 1:
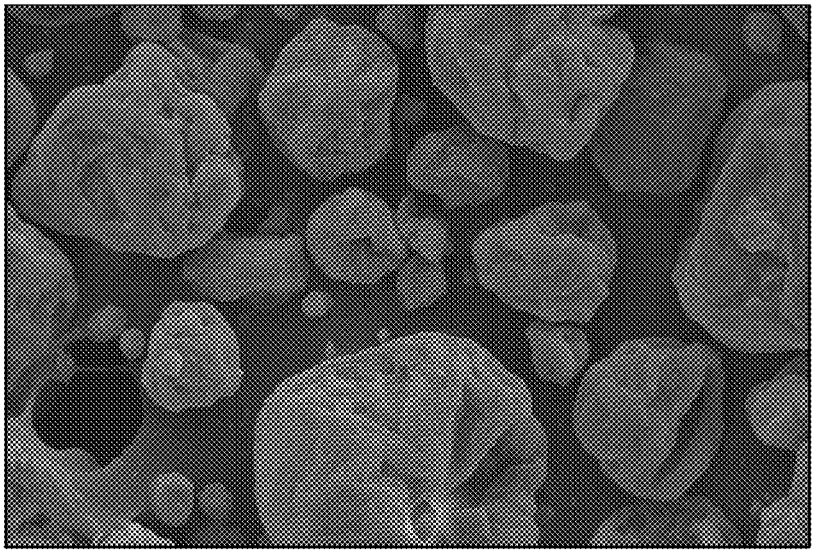
FIG. 1 is a scanning electron microscope (SEM) image of Feed Material A (Acti-Gel 208) at low magnification (500×).

This disclosure relates to products for stabilizing/chill proofing of fermented liquids by adsorbing proteins from such fermented liquids. Such fermented liquids may include, but are not limited to: beer, wine, cider, vinegar or the like. Beer may comprise, but is not limited to, Pilsner, Lager (e.g., Helle, American Lager, bock, Marzen, Schwarzbier, etc.), ale (e.g., India Pale Ale (IPA), pale ale, bitter, Saison, barley wine, Tripel, Biere de Garde, etc.) porter, stout, wheat-beer, Belgian beer, sour beer, witbier, dunkel, Kolsch, Lambic, steam beer, rye beer, Berliner Weisse, Doppelbock, Weizenbock, Dubbel, Gueuze, malt liquor, Altbier or the like.

The products disclosed herein comprise, or may be, attapulgite or sepiolite or mixtures thereof. Attapulgite is sometimes referred to as palygorskite. To avoid confusion, as used herein, the term "attapulgite" means attapulgite and/or palygorskite. As is known in the art, attapulgite and sepiolite are each a chain crystal lattice type of clay mineral that is structurally different from other clays such as montmorillonite or bentonite. Namely, the tetrahedral sheets of attapulgite, or sepiolite, are divided into ribbons by inversion because adjacent bands of tetrahedra within one tetrahedral sheet point in opposite directions rather than in one direction thus creating a structure of ribbons of 2:1 layers joined at their edges, and the octahedral sheets are continuous in two dimensions only. The structures of both minerals are similar in that tetrahedra pointing in the same direction form 2:1 ribbons that extend in the direction of the a-axis and have an average b-axis width of three linked tetrahedral chains in sepiolite and two linked chains in attapulgite. Attapulgite and sepiolite are non-swelling clays unlike clays such as bentonite and montmorillonite, which are known to be swelling clays. Swelling clays are clays that experience a relatively large increase in volume (due to an increase in interlayer spacing in clay particles) in water-based liquids.

Although natural attapulgite or sepiolite each may have chill proofing efficacy, attapulgite or sepiolite cannot be directly used for chill proofing fermented liquids. For example, when natural attapulgite is added to a fermented liquid (e.g., beer), it creates very strong earthy or "cardboard" odors and/or flavors in the fermented liquid. This is unacceptable by the breweries and other producers of fermented liquids used for beverages. In addition, natural attapulgite undesirably also reduces the acidic/sour notes in beer due to the increase in beer pH resulting from contact with the natural attapulgite. Natural sepiolite suffers from similar drawbacks.

Disclosed herein are novel products that may comprise, or may be, attapulgite or sepiolite or mixtures thereof, and the process for making and using such products. Due to the unique porous structure, pore size and high surface area of the novel products disclosed herein such products may be used to effectively stabilize fermented liquids by adsorbing proteins and the like that cause precipitation and/or chill haze in fermented liquids used for beverages (e.g., beer, wine, cider or the like) and other edible liquids (vinegar or the like). For example, test results show that such novel products significantly reduce a wide range of chill haze for fermented beverages. Furthermore, due to the very low permeability of traditional chill-proofing agents, using the products disclosed herein that are more highly permeable in filter paper/filter media or as body feed or mixed with filter aids as body feed during filtering of the fermented liquid (e.g., beer), even at low concentrations, results in a significant shortening of the filter time for such fermented liquids (e.g., beer), which provides for significant efficiency gains for brewers and the like because of the reduction in the stabilization/chill proofing process time. For example, using those more highly permeable novel products disclosed herein can improve the stabilization and chill proofing process efficiency by simplifying the traditional two-step process for processing of fermented liquids from (1) silica gel stabilization reaction and (2) subsequent filtration to remove the "used" silica gel particles to a single process step of simultaneous stabilization and filtration in which the fermented liquid is filtered and chill proofed (e.g., when passing through filter paper or filter media impregnated with the more permeable novel products disclosed herein, or when such permeable novel products are used as body feed or mixed with filter aids used as body feed). The simplified process reduces cost and complexity. Compared to conventional silica gel and diatomite composite products, filtering time using such products as an adsorbent is significantly less. This further reduces cost and increases production throughput. In other embodiments, the novel products disclosed herein may be used in similar processes as the current more expensive traditional chill-proofing agents (e.g., silica gel) and achieve desired chill proofing at significantly less expense. For example, in one embodiment, the novel products disclosed herein may be added to the maturation tank utilized in the fermentation process and then subsequently filtered out.

Such novel product for stabilizing/chill proofing fermented liquid may comprise attapulgite or sepiolite or mixture thereof. The product or the attapulgite or the sepiolite may have a particle size distribution having a $d_{50}$ of 5-19 microns or 10-19 microns. The product or the attapulgite or the sepiolite may further have a pore volume of 0.5-1.9 mL/g or 0.7-1.5 mL/g. The product or the attapulgite or sepiolite may have a porosity in the range of 30-90% or 40-80% or 49-72% or 45-75%. The attapulgite may comprise particles having an intrinsic pore size in the range of 6-50 nm or 10-50 nm or 15-35 nm or 20-30 nm or the sepiolite may comprise particles having an intrinsic pore size in the range of 6-50 nm or 10-50 nm or 15-35 nm or 20-30 nm. The product may have a Stabilizing Power of 40-100% at a loading of 20-200 g of the product per HL of fermented liquid, or Stabilizing Power of 50-100% at a loading of 30-180 g of the product per HL of fermented liquid, or Stabilizing Power of 40-100% at a loading of 35-100 g of the product per HL of fermented liquid, or Stabilizing Power of 50-100% at a loading of 75-100 g of the product per HL of fermented liquid.

In any one of the embodiments above, the attapulgite or sepiolite may have: inter pores around about 2 microns to about 50 microns with a peak position at about 15 to about 30 microns; or inter pores at about 2 microns to about 20 microns with peak position(s) at about 3 microns to about 17 microns.

In any one of the embodiments above, the attapulgite or sepiolite may have been treated with acetic acid and the product may have a pH in water of 6-8 or 6.5-7.5 or 6.9-7.1 measured in a 2 wt. % slurry.

In any one of the embodiments above, the fermented liquid may be beer and the product may have no more than 1.5 ppm beer soluble iron or may have no more than 1.2 ppm beer soluble iron or may have a beer soluble iron content of 0.1-1.3 ppm, each as measured by the modified ASBC method.

In any one of the embodiments above, the fermented liquid may be beer and the product may have a beer Stabilizing Power of 40-100% at a loading of 35-100 g of the product per HL of beer, or beer Stabilizing Power of 50-100% at a loading of 75-100 g of the product per HL of beer.

In any one of the embodiments above, the product or the attapulgite or the sepiolite may have a surface area in the range of 90-130 $m^2/g$ or 90-150 $m^2/g$ each as measured using the BET method.

In any one of the embodiments above, the product or the attapulgite or the sepiolite may further have: a particle size distribution having a $d_{90}$ in the range of 2-8 microns or 4-7 microns; and/or a particle size distribution having a $d_{90}$ in the range of 10-70 microns or 20-42 microns.

In any one of the embodiments above, the fermented liquid may be a beer, wine, cider or vinegar. Wherein the product is free of composite material or is free of a composite material that includes: (a) attapulgite agglomerated to a first material that is not attapulgite or sepiolite or (b) sepiolite agglomerated to the first material that is not attapulgite or sepiolite.

In any one of the embodiments above, the fermented liquid may be a beer, wherein the beer is an IPA, Lager or Pilsner.

In any one of the embodiments above, the product may have a ratio of $Al_2O_3$ to $SiO_2$ in the range of 0.17-0.22, a ratio of MgO to $SiO_2$ in the range of 0.12-0.16, and a ratio of MgO to $Al_2O_3$ in the range of 0.75-0.85.

In some embodiments, the product produced may be in particulate or powder form or may be in a non-extruded (free of extrusion) form. In one or more embodiments, the product may be free of composite material. In one or more embodiments, the product may be free of composite material that includes: (1) attapulgite or sepiolite and (2) an other material, wherein the other material is agglomerated to the attapulgite or sepiolite to form the composite. In one or more embodiments, the product may be free of a synthetic alkaline earth metal silica and/or polyvinyl resin and/or diatomaceous earth and/or natural glass and/or swelling clay. Synthetic alkaline earth metal silica may include but is not limited to synthetic magnesium silicate and synthetic calcium silicate. Natural glass may include but is not limited to perlite, a volcanic ash, a pumice, a pumicite, a shirasu, an obsidian, a pitchstone, a rice hull ash, and mixtures thereof. Swelling clay may include but is not limited to montmorillonite and bentonite.

In any one of the embodiments above, the fermented liquid may be a beer, wine, cider or vinegar.

In any one of the embodiments above, the attapulgite or sepiolite may be heat treated.

Preparation of the Product

The method of producing the products discussed above may comprise selecting a natural attapulgite or a natural sepiolite or a mixture thereof for processing. Attapulgite/palygorskite is a magnesium aluminium phyllosilicate with the chemical formula $(Mg,Al)_2Si_4O_{10}(OH)\cdot4H_2O$. Sepiolite is a fibrous hydrated magnesium silicate with the chemical formula $Mg_4Si_6O_{15}(OH)_2\cdot6H_2O$. The percentages of the various elements may vary depending on the deposit from which the attapulgite or sepiolite is sourced. Both minerals have similar crystal structure with three linked tetrahedral chains in sepiolite and two linked chains in attapulgite.

The bulk chemistry of the attapulgite or sepiolite used in the feed material impacts the extractable metal properties of the resulting product as such impurities can form extractable metals when the product comes into contact with the fermented liquid. Thus, the attapulgite or sepiolite may undergo a purification process to reduce impurities prior to the further processing disclosed herein. Such purification processes are known in the art.

The process may include sizing the selected material (attapulgite or sepiolite or mixture thereof). Such sizing of the selected material may include agglomerating, air classifying and/or screening of the selected material (attapulgite or sepiolite or mixture thereof). In an embodiment, the agglomerating may be done (with or without a binder) from mechanical processes (e.g., spray drying, high-shear mixing, or the like). Spray drying techniques for agglomeration are known to those of ordinary skill in the art in the clay industry. One exemplary known method is to prepare a slurry of material (e.g., attapulgite, sepiolite, or mixture thereof) and water, and utilize a spray dryer to disperse the slurry into droplets using high pressure nozzles, disks or the like. The temperature of the inlet and outlet air of the spray dryer depends on the dryer used. The droplets then become generally rounded agglomerations of particles and are collected downstream of a drying chamber. Alternatively, other appropriate methods known in the art may be used to spray dry clay or agglomerate clay, use of a high-shear mixer such as turbulizer and pin mixer or an agglomerator such as rotary drum agglomerators, or the like. Such methods may be used with or without a binder.

The air classifying may be done using processes known in the art. For example, the attapulgite of certain of the examples discussed herein was classified using an Alpine™ 200 ATP air classifier (Hosokawa Micron Powder Systems, Summit, N.J.) to produce a course fraction. The following parameters were utilized with the Alpine™ 200 ATP classifier: classifier wheel speed at 5000 rpm, total air flow at 500 SCFM (Standard Cubic Feet per Minute) and feed rate at 390 lb/hr (176.9 kg/hr). Yield for coarse fraction was 82%. Other appropriate wheel speeds, air flow and feed rates may be utilized to produce appropriate coarse fractions.

Similarly, the screening may be done via processes known in the art. For example, a rotap sieve shaker with a mesh screen may be utilized to obtain a fraction above or below a desired size. For example, a rotap sieve shaker with a mesh screen may be utilized to obtain a fraction above 400 (also known as +400) or 500 mesh (+500) or other desired mesh size. Vibration screens can also be used particle separation.

Optionally, the method may further include mixing the material (natural and/or sized and/or purified attapulgite/sepiolite/mixture thereof) with acetic acid solution until well mixed to adjust the pH of the selected material. The inventors have found that addition of natural attapulgite with a high pH reduces acidic notes of the beer and affects beer flavor since typical pH value of a barley-based beer is usually around 4.1 to 4.5 and that of a wheat-based beer is slightly lower. In an embodiment, the mixing of the material with acetic acid solution adjusts the pH of the selected material as measured in water to a pH in the range of 6-8. In another embodiment, the mixing of the material with acetic acid solution adjusts the pH of the selected material as measured in water to a pH in the range of 6.5-7.5. In another embodiment, the mixing of the material with acetic acid solution adjusts the pH of the selected material as measured in water to a pH in the range of 6.9-7.1 or about 7. In an embodiment, the acetic acid solution may have a concentration in the range of 5 to 15% acetic acid. In various embodiments discussed herein, the natural attapulgite was mixed with a 10% acetic acid solution in a KitchenAid 5-quart food mixer at low speed until well mixed (e.g., for about 30 minutes). Using an acetic acid solution having a concentration of 10%, the weight percent of liquid (acetic acid solution) mixed with solid (attapulgite, sepiolite or mixture thereof) may be about 5-about 10 wt. % liquid (acetic acid solution) and about 95-about 90 wt. % of solid (attapulgite, sepiolite, or mixture thereof). For example, in various embodiments herein, 200 g of the selected natural attapulgite was mixed with an 20 g of 10% acetic acid solution until well mixed to adjust the pH of the natural attapulgite. The weight percentages of liquid to solid may vary for acetic acid solutions of other concentrations in the range of 5-15%. In other embodiments, mixing time may vary. For example, the liquid and solid material may also be mixed for 10-60 minutes or other appropriate time period to be well-mixed. Other food grade acids such as citric acid can also be used to adjust the pH of attapulgite or sepiolite.

The method further includes heat treating the material (attapulgite, sepiolite or mixture thereof). In embodiments in which the method includes mixing the material (attapulgite, sepiolite or mixture thereof) with acetic acid solution, the resultant mixture may be placed in a ceramic boat or other appropriate container and subsequently heat-treated at about 200-about 600° C., or about 250-about 600° C., or about 250-about 500° C., or about 300-400° C. In an embodiment, the heat treating may be for about 10-about 60 minutes. For example, in an embodiment, the heat treating may be at about 250° C. to about 500° C. for about 30 minutes. The above removes earthy odors in the fermented liquid (e.g., beer) that result from contact with natural attapulgite or natural sepiolite. In embodiments in which the natural material (attapulgite, sepiolite, mixture thereof) has not been treated with an acetic acid solution, then such material (attapulgite, sepiolite or mixture thereof) may be placed in a ceramic boat or other appropriate container and heated in a muffle furnace at about 200-about 600° C., or about 250-about 600° C., or about 250-about 500° C., or about 300-400° C. to remove earthy odors in beer resulting from contact with natural attapulgite or natural sepiolite. In an embodiment, the heat treating may be for about 10-about 60 minutes. For example, in an embodiment, the heat treating may be at about 250° C.-about 500° C. for about 30 minutes.

In one or more embodiments, the product produced may be in particulate or powder form or may be in a non-extruded (free of extrusion) form. In one or more embodiments, the product may be free of composite material. In one or more embodiments, the product may be free of composite material that includes: (1) attapulgite or sepiolite and (2) an other material, wherein the other material is agglomerated to the attapulgite or sepiolite to form the composite. In one or more embodiments, the product may have a ratio of $Al_2O_3$ to $SiO_2$ in the range of 0.17-0.22, and the product may have a ratio of MgO to $SiO_2$ in the range of 0.12-0.16, and the product may have a ratio of MgO to $Al_2O_3$ in the range of 0.75-0.85. In one or more embodiments, the product may be free of a synthetic alkaline earth metal silica and/or polyvinyl resin and/or diatomaceous earth and/or natural glass and/or swelling clay. Synthetic alkaline earth metal silica may include but is not limited to synthetic magnesium silicate and synthetic calcium silicate. Natural glass may include but is not limited to perlite, a volcanic ash, a pumice, a pumicite, a shirasu, an obsidian, a pitchstone, a rice hull ash, and mixtures thereof. Swelling clay may include but is not limited to montmorillonite and bentonite.

Adsorption Process

The products disclosed herein may each be used to adsorb proteins or the like that cause chill haze in fermented liquids. Fermented liquid may include, but is not limited to, beer, wine, cider, vinegar or the like. The method for reducing chill haze in fermented liquids may comprise: contacting (or mixing) for a contact time the fermented liquid with any one of the products disclosed herein that comprise, or may be, attapulgite or sepiolite or a mixture thereof. For example, in one embodiment, the fermented liquid may flow through filter paper/filter media that may be impregnated with the novel product. In another embodiment, the novel product may be used as body feed or mixed with a filter aid used as body feed. In yet another embodiment, the novel product may be added to the maturation tank utilized in the fermentation process. In an embodiment, the contact time may vary depending on the application. For example, when utilized in an application in which the novel product is impregnated in a filter paper or filter media, the contact time in some embodiments may be about 25 seconds-about 60 minutes. In other similar embodiments, the contact time may vary. Whereas when added to a maturation tank the contact time may be longer (e.g., in one embodiment, an hour to several days), depending on the maturation process the producer utilizes for the fermented liquid. The contact time when used as body feed or mixed with a filter aid used as body feed may also vary.

The loading is that amount of the product sufficient to reduce the amount of chill haze in the fermented liquid in a given contact time such that a Stabilizing Power % of at least 40-100%, 50-100%, 60-100% or 70-100% or 80-100%, or about 50-80% is achieved. As used herein the term Stabilizing Power of a dosage of adsorbent in a given fermented liquid is the percentage reduction in the amount of chill haze in the fermented liquid in a given contact time with that adsorbent as compared to the same dosage of Silica Hydrogel (SH) in the same fermented liquid at the same conditions. The calculation is illustrated later herein. For example, in an embodiment, the product may have a Stabilizing Power % of at least 40-100% or 50-100% or 60-100% or 70-100% or 80-100%, each at a loading of 20-200 grams (g) of the product per hectoliter (HL) of fermented liquid or at a loading of 25-125 g of the product per HL of fermented liquid or at a loading of 35-100 g of the product per HL of fermented liquid or at a loading of 75-100 g of the product per HL of fermented liquid.

For example, in an embodiment, the product may have a Stabilizing Power % in beer (a beer Stabilizing Power %) of at least 40-100%, at a loading of 20-200 g/HL of beer or at a loading of 25-125 g/HL of beer; in another refinement, the product may have a Beer Stabilizing Power % of at least 50-100% at a loading of 20-200 g/HL of beer or 25-125 grams/HL of beer; in another refinement, the product may have a Beer Stabilizing Power % of at least 60-100% at a loading of at a loading of 20-200 g/HL of beer or 25-125 g/HL of beer; in another refinement, the product may have a Beer Stabilizing Power % of at least 70-100% at a loading of at a loading of 20-200 g/HL of beer or 25-125 g/HL; in another refinement, the product may have a Beer Stabilizing Power % of at least 80-100% at a loading of at a loading of 20-200 g/HL of beer or 25-125 g/HL of beer, or in another refinement, the product may have a Beer Stabilizing Power % of at least 50-80%, at a loading of at a loading of 20-200 g/HL of beer or 25-125 g/HL of beer.

The method further comprises recovering the product from the fermented liquid to obtain a resultant fermented liquid that has a lower chill haze or has a lower amount of proteins and/or polyphenol that cause chill haze than the fermented liquid had prior to the contacting or mixing. The resultant fermented liquid may be recovered by collecting/capturing the resultant fermented liquid after chill proofing (e.g., after passing through a filter paper or filter media impregnated with the product, or passing through a precoat that contains the product, or the like), or by filtering out or separating the product from the fermented liquid (e.g., from a slurry or maturation tank or the like) or by any other appropriate method known to those of skill in the art to obtain a resultant fermented liquid or to separate the resultant fermented liquid from the product used to chill proof.

Other adsorption methods may be utilized and the contact time may be adjusted as appropriate.

Description of Test Methods

Surface Area, Pore Volume, Pore Size Distribution, Porosity

Surface area was measured by the nitrogen adsorption method of the BET (Brunauer—Emmett—Teller) method. Pore volume and pore size distribution of a sample of material was determined by mercury porosimetry. The mercury porosimetry uses mercury as an intrusion fluid to measure pore volume of a (weighed) sample of material enclosed inside a sample chamber of a penetrometer. The sample chamber is evacuated to remove air from the pores of the sample. The sample chamber and penetrometer are filled with mercury. Since mercury does not wet the material surface, it must be forced into the pores by means of external pressure. Progressively higher pressure is applied to allow mercury to enter the pores. The required equilibrated pressure is inversely proportional to the size of the pores, only slight pressure is required to intrude the mercury into macropores, whereas much greater external pressure is required to force mercury into small pores. The penetrometer reads the volume of mercury intruded and the intrusion data is used to calculate pore size distribution, porosity, average pore size and total pore volume. A Micromeritics AutoPore IV 9500 was used to analyze the samples herein.

Assuming pores of cylindrical shape, a surface distribution may be derived from the pore volume distribution for use in calculations. An estimate of the total surface area of the sample of material may be made from the pressure/volume curve (Rootare, 1967) without using a pore model as $$A = \frac{1}{\gamma\cos\theta}\int_{V_{Hg,0}}^{V_{Hg,max}} p\,dV$$

Where, A=total surface area

γ=surface tension of the mercury

θ=angle of contact of mercury with the material pore wall p=external applied pressure V=pore volume From the function V=V(p) the integral may be calculated by leans of a numerical method.

From the pressure versus the mercury intrusion data, the instrument generates volume and size distribution of pores following the Washburn equation (Washburn, 1921) as:

$$d_i = \frac{4\gamma\cos\theta}{P_i}$$

Where, $d_i$=diameter of pore at an equilibrated external pressure

γ=surface tension of the mercury

θ=angle of contact of mercury with the material pore wall $P_i$=external applied pressure The average pore diameter is determined from cumulative intrusion volume and total surface area of the sample of material as:

$$D = \frac{4V}{S}$$

Where, D=average pore diameter

V=total intrusion volume of mercury

S=total surface area

Porosity is the fraction of the total material volume that is taken up by the pore space. Porosity was calculated from mercury intrusion data.

American Society of Brewing Chemists (ASBC) Beer 27 Test Method (Total) beer chill haze was measured using a Haze Meter. A nephelometer cuvet is chilled in a small ice-water bath containing a wetting agent (external contact only). The container of beer is removed from the 0° C. constant temperature bath and, without disturbing any sediment, the cuvet is rinsed and then filled with the chilled beer sample. The cuvet is placed in the small ice-water bath and then the beer is degassed by stirring with a thermometer. When the temperature of the beer in the cuvet is 0° C., the cuvet is placed in the sample chamber of nephelometer and a reading is obtained by the nephelometer. The reading is in nephelometric turbidity unit (NTU). The "chill haze" measured herein is the total chill haze after chilling the fermented liquid (e.g., beer) at 0° C.

Test for pH of Adsorbent in Water

The pH of the adsorbent in water was measured for exemplary embodiments of the novel products disclosed herein. 196.0 g of distilled water was placed into a multmixer cup. Four (4.0) g of product to be tested was added to the distilled water to create a 2 wt. % slurry. The mixing cup was placed on a multimixer and mixed for five (5) minutes. A magnetic stir bar was placed in a 100-250 milliliter (mL) beaker and placed on an electric stirrer. The slurry of distilled water and product was removed from the mixer and poured into the beaker. The speed of the stirrer was adjusted to create a steady, gentle circulation. The pH was determined by submerging a pH electrode into the slurry and obtaining the pH measurement.

Test for pH of Adsorbent in Beer

The pH of the adsorbent in beer was measured for exemplary embodiments of the novel products disclosed herein. 150.0 g of beer was placed into a multmixer cup. Two (2.0) g of product to be tested was added to the beer to create about 1.3 wt. % slurry. The mixing cup was placed on a multimixer and mixed for five (5) minutes. A magnetic stir bar was placed in a 100-250 mL beaker and placed on an electric stirrer. The slurry of beer and product was removed from the mixer and poured into the beaker. The speed of the stirrer was adjusted to create a steady, gentle circulation. The pH was determined by submerging a pH electrode into the slurry and obtaining the pH measurement.

Test for Beer Soluble Iron

The amount of beer soluble iron was measured for exemplary embodiments of the novel products disclosed herein in the following modified American Society of Brewing Chemists (ASBC) test. A 500 milliliter (mL) flask containing 200 g of Budweiser beer was degassed. Five (5) g of a representative sample of the absorbent was added to the degassed beer. The mixture was swirled at every minute interval for a total of six (6) minutes. The mixture was then filtered using 19-26-micron filter paper and the concentration of iron in the beer was measured using inductively coupled plasma (ICP) spectrometry.

EXAMPLES

The products of Examples 1-8 each comprise attapulgite. The products of Examples 1-8 were prepared from the different attapulgite feed materials listed in Table 1.

TABLE 1

Feed Materials.

| | Feed material | Surface Area ($m^2$/g) | d10 (μm) | d50 (μm) | d90 (μm) | Pore Volume (mL/g) | Porosity (%) |
|---|---|---|---|---|---|---|---|
| Feed Material A | Purified natural attapulgite product Acti-Gel 208 ® | 135 | 4.51 | 14.5 | 34.1 | 1.4931 | 75.8 |
| Feed Material B | Min-U-Gel 400 ® | 142 | 3.29 | 8.70 | 16.53 | 1.4806 | 73.6 |
| Feed Material C | Min-U-Gel 200 ® | 88.3 | 6.43 | 18.2 | 63.7 | 1.1853 | 72.0 |
| Feed Material D | Natural attapulgite | 141 | 3.89 | 13.49 | 33.93 | 1.1935 | 68 |

Feed material A was prepared using the commercially available Acti-Gel 208 ® (Active Minerals International, LLC), an attapulgite product, as feed material. The Acti-Gel 208 product is natural attapulgite that has been purified and agglomerated via spray drying. FIG. 1 is a SEM image of Feed Material A (Acti-Gel 208) at low magnification (×500).

The major elemental composition of Feed Material A, as determined by wave-length dispersive x-ray fluorescence (XRF) analysis for Acti-Gel 208, is shown in Table 2. Table 2. Major Oxide Composition of purified natural attapulgite product Acti-Gel 208 used as feed material (Ignited Basis).

| Total Chemistry for Acti-Gel 208 as determined by XRF (expressed as oxides)[1] | |
|---|---|
| $SiO_2$ (wt. %) | 51.1 |
| $Al_2O_3$ (wt. %) | 10.8 |
| $Fe_2O_3$ (wt. %) | 3.5 |
| CaO (wt. %) | 2.2 |
| MgO (wt. %) | 8.4 |
| $Na_2O$ (wt. %) | 0.5 |
| $K_2O$ (wt. %) | 0.6 |
| $TiO_2$ (wt. %) | 0.4 |
| $P_2O_5$ (wt. %) | 0.6 |
| Free Moisture, wt. % @ 220° F. (104° C.) | 9.0 |
| Residue (wet) % retained on 325 mesh screen | 0.01 |

[1]Although the elements are reported as oxides, they are actually present as complex aluminosilicates.

Figure 2:
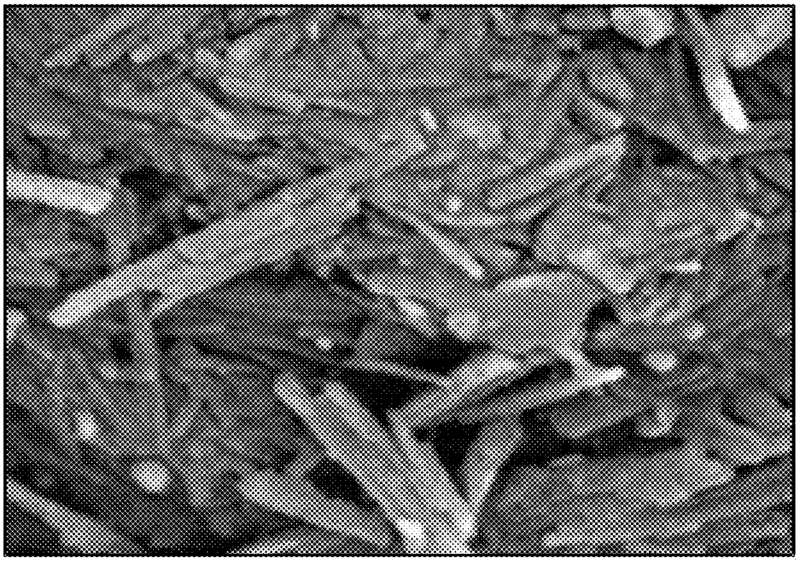
FIG. 2 is a SEM image of Feed Material B at high magnification (100,000×).
Figure 3:
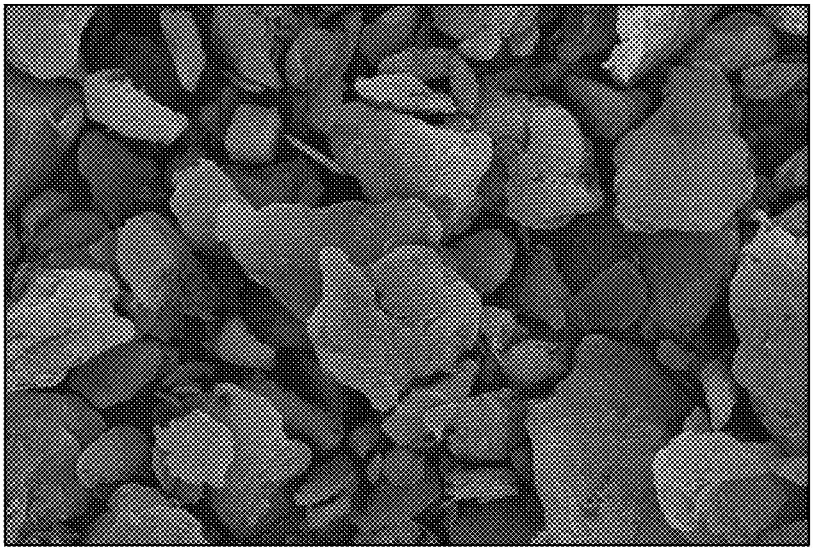
FIG. 3 is a SEM image of Feed Material B at low magnification (2000×).

Feed Material B was prepared using the commercially available Min-U-Gel 400 ® (Active Minerals International, LLC) as feed material. The Min-U-Gel 400 product is a non-purified natural attapulgite that has been air classified. FIG. 2 is a SEM image of Feed Material B at high magnification (100,000×). FIG. 3 is a SEM image of Feed Material B at low magnification (2000×). The major elemental compositions of Min-U-Gel 400, as determined by wave-length dispersive x-ray fluorescence (XRF) analysis, is shown in Table 3.

TABLE 3

| Major Oxide Composition of air classified natural attapulgite Min-U-Gel 400 used as feed materials (Ignited Basis). Total Chemistry for Min-U-Gel 400 as determined by XRF (expressed as oxides) [1] | |
|---|---|
| $SiO_2$ (wt. %) | 66.2 |
| $Al_2O_3$ (wt. %) | 12.1 |
| $Fe_2O_3$ (wt. %) | 4.2 |
| CaO (wt. %) | 2.8 |
| MgO (wt. %) | 9.9 |
| $Na_2O$ (wt. %) | |
| $K_2O$ (wt. %) | 1.1 |
| $TiO_2$ (wt. %) | 0.6 |
| $P_2O_5$ (wt. %) | 1.0 |
| Free Moisture, wt. % @, 220° F. (104° C.) | 13.5 |
| Residue (wet) % retained on 325 mesh screen | 0.005 |

[1] Although the elements are reported as oxides, they are actually present as complex aluminosilicates.

Feed Material C was prepared using the commercially available Min-U-Gel 200 ® (Active Minerals International, LLC) as feed material. The Min-U-Gel 200 product is a non-purified natural attapulgite that has been air classified. The major elemental compositions of Min-U-Gel 200, as determined by wave-length dispersive x-ray fluorescence (XRF) analysis, is shown in Table 4.

TABLE 4

| Major Oxide Composition of air classified natural attapulgite Min-U-Gel 200 used as feed materials (Ignited Basis). Total Chemistry for Min-U-Gel 200 as determined by XRF (expressed as oxides) [1] | |
|---|---|
| $SiO_2$ (wt. %) | 66.2 |
| $Al_2O_3$ (wt. %) | 11.7 |
| $Fe_2O_3$ (wt. %) | 4.0 |
| CaO (wt. %) | 2.9 |
| MgO (wt. %) | 9.7 |
| $Na_2O$ (wt. %) | |
| $K_2O$ (wt. %) | 1.1 |
| $TiO_2$ (wt. %) | 0.6 |
| $P_2O_5$ (wt. %) | 1.0 |
| Free Moisture, wt. % @ 220° F. (104° C.) | 12.5 |
| Residue (wet) % retained on 325 mesh screen | 6.9 |

[2] Although the elements are reported as oxides, they are actually present as complex aluminosilicates.

Feed Material D was prepared using as feed material natural attapulgite mined near Climax, Georgia by Active Minerals International, LLC. The major elemental composition of this feed material, as determined by wave-length dispersive XRF analysis, is shown in Table 5.

TABLE 5

| Major Oxide Composition of natural attapulgite material used as feed material (Ignited Basis). Total Chemistry as determined by XRF (expressed as oxides)[1] | |
|---|---|
| $SiO_2$ (wt. %) | 66.2 |
| $Al_2O_3$ (wt. %) | 12.1 |
| $Fe_2O_3$ (wt. %) | 4.2 |
| CaO (wt. %) | 2.8 |
| MgO (wt. %) | 9.9 |
| $K_2O$ (wt. %) | 1.1 |
| $CO_2$ (wt. %) | 1.8 |
| $TiO_2$ (wt. %) | 0.6 |
| $P_2O_5$ (wt. %) | 1.0 |
| $SO_4$ (wt. %) | 0.2 |
| Other | 0.1 |

[1]Although the elements are reported as oxides, they are actually present as complex aluminosilicates.

The feed materials A—D have a high surface area from 88 to 142 $m^2/g$, as measured by the nitrogen adsorption method based on the Brunauer—Emmett—Teller (BET) theory. Particle size ($d_{50}$) of these feed materials, as measured by a laser particle size analyzer, is around 8-19 microns. The feed materials A—D also contain about 9-14 wt. % moisture (at 104° C. (220° F.)).

Examples 1-2

Example 1 was prepared from Feed Material A by mixing 200 grams (g) of Feed Material A with 20 g of a 10% acetic acid solution in a KitchenAid® 5-quart food mixer for 30 minutes at low speed. The resulting mixture was then placed in a ceramic boat and heat-treated at 250° C. for 30 minutes. Similarly, Example 2 was prepared from Feed Material A by mixing 200 g of Feed Material A with 20 g of a 10% acetic acid solution in a KitchenAid® 5-quart food mixer for 30 minutes at low speed. The resulting mixture was then heat-treated at 300° C. for 30 minutes.

Examples 3-6

For each of Examples 3-6, 100 g of Feed Material B was placed in a ceramic boat and heated in a muffle furnace for 30 minutes. Example 3 was heated in the muffle furnace at 300° C., Example 4 was heated in the muffle furnace at 400° C., Example 5 was heated in the muffle furnace at 500° C. and Example 6 was heated in the muffle furnace at 600° C.

Example 7

Example 7 was prepared from Feed Material D by air-classifying Feed Material D using an Alpine™ 200 ATP air classifier (Hosokawa Micron Powder Systems, Summit, N.J.) to produce a course fraction. The following parameters were utilized with the Alpine™ 200 ATP classifier: classifier wheel speed at 5000 rpm, total air flow at 500 SCFM (Standard Cubic Feet per Minute) and feed rate at 390 lb/hr (176.9 kg/hr). Yield for coarse fraction was 82%. The particle size distribution (psd) of a representative sample of the resulting coarse fraction may be seen in Table 6.

TABLE 6

Particle Size Distribution of Feed Material D and Coarse Fraction of Classified Material D.

| Material | d10 (μm) | d50 (μm) | d90 (μm) |
|---|---|---|---|
| Feed Material D | 3.89 | 13.49 | 33.93 |
| Coarse Fraction | 4.26 | 14.13 | 30.67 |

The course fraction of the air-classified Feed Material D was then mixed with 20 g of a 10% acetic acid solution in a KitchenAid 5-quart food mixer for 30 minutes at low speed. The resulting mixture was then placed in a ceramic boat and heat-treated at 400° C. for 30 minutes.

Example 8

Example 8 was prepared by using a rotap sieve shaker with a 500-mesh screen to screen Feed Material C. Feed Material C was shaken for about ten minutes on the 500-mesh screen. 200 g of the portion of Feed Material C that did not pass through the 500-mesh screen (the +500 mesh portion of Feed Material C) was then mixed with 20 g of a 10% acetic acid solution in a KitchenAid 5-quart food mixer for 30 minutes at low speed. The resulting mixture was then placed in a ceramic boat and heat-treated at 400° C. for 30 minutes.

Example 9

Example 9 was prepared from Feed Material D by air-classifying Feed Material D using an Alpine™ 200 ATP air classifier (Hosokawa Micron Powder Systems, Summit, N.J.) to produce a course fraction. The following parameters were utilized with the Alpine™ 200 ATP classifier: classifier wheel speed at 5000 rpm, total air flow at 500 SCFM (Standard Cubic Feet per Minute) and feed rate at 390 lb/hr (176.9 kg/hr). Yield for coarse fraction was 82%. The particle size distribution of a representative sample of the resulting coarse fraction may be seen in Table 6.

The coarse fraction was then shaken for about ten minutes on a 400-mesh screen of a rotap sieve shaker. 200 g of the portion of the coarse fraction of the air-classified Feed Material D that did not pass through the 400-mesh screen (the +400 mesh portion of Feed Material D) was then mixed with 20 g of a 10% acetic acid solution in a KitchenAid 5-quart food mixer for 30 minutes at low speed. The resulting mixture was then placed in a ceramic boat and heat-treated at 400° C. for 30 minutes.

Example 10

Example 10 was prepared from Feed Material A by placing 100 g of Feed Material A in a ceramic boat and heating in a muffle furnace for 30 minutes at 400° C.

Chill Haze Testing

The products disclosed herein may each be used to stabilize beer by adsorbing the proteins that cause chill haze. Each of the adsorbents 1-10 herein were tested according to ASBC Beer 27 Test Method for determining (total) beer chill haze (as described earlier herein).

For the chill haze test for each of the adsorbents of Examples 1-9, a representative sample of the respective adsorbent was added to 200 mL of IPA or lager at 40 g per Hectoliter (HL) to about 100 g/HL dosages. For comparison purposes, a representative sample of Feed Material A was added to 200 mL of Pilsner beer. Similarly, a representative sample of a silica hydrogel (Britesorb® A100, Gusmer Enterprises, Inc.) was added to each of 200 mL of Pilsner beer, IPA and Lager at 40 g/HL to about 100 g/HL dosages.

The fermented liquid containing the respective adsorbent was placed on a shaker and shaken for 30 minutes and then filtered using 19-26-micron filter paper to remove the adsorbent. Each filtered fermented liquids (beer) were then placed for about 24 hours in a constant temperature (0° C.+/−0.2° C.) ice bath. For each chilled filtered beer, a cuvet was filled with a sample of the chilled filtered beer, chilled in an ice bath and degassed (by stirring). When the beer in the cuvet was 0° C., the cuvet was placed into the sample chamber and analyzed with a Haze Meter according to ASBC Beer 27 Test Method. The results of the chill haze testing are shown in Table 7. The chill haze is expressed in Nephelometric Turbidity Unit (NTU), which is the unit used to measure the turbidity of a fluid or the presence of suspended particles in a fluid.

TABLE 7

Results of Chill Haze Test for Adsorbents.

| Adsorbent | Fermented Liquid (Beer) | Adsorbent Dosage (g/HL) | Chill Haze (NTU) |
|---|---|---|---|
| Blank beer (untreated) | Pilsner | 0 | 10.66 |
| Silica Hydrogel (Britesorb A100) | Pilsner | 100 | 3.63 |
| Feed Material A | Pilsner | 100 | 5.83 |
| Blank beer (untreated) | IPA | 0 | 48.58 |
| Silica Hydrogel (Britesorb A100) | IPA | 100 | 12.51 |
| Feed Material A | IPA | 100 | 17.79 |
| Blank beer (untreated) | IPA | 0 | 26.46 |
| Silica Hydrogel (Britesorb A100) | IPA | 100 | 8.77 |
| Example 1 | IPA | 100 | 16.50 |
| Example 2 | IPA | 100 | 15.03 |
| Example 3 | IPA | 100 | 14.96 |
| Blank beer (untreated) | IPA | 0 | 24.65 |
| Silica Hydrogel (Britesorb A100) | IPA | 100 | 9.15 |
| Example 4 | IPA | 100 | 11.95 |
| Example 5 | IPA | 100 | 12.78 |
| Example 6 | IPA | 100 | 16.71 |
| Blank beer (untreated) | IPA | 0 | 30.10 |
| Silica Hydrogel (Britesorb A100) | IPA | 100 | 21.72 |
| Example 7 | IPA | 100 | 22.37 |
| Example 8 | IPA | 100 | 22.60 |
| Blank beer (untreated) | IPA | 0 | 7.10 |
| Silica Hydrogel (Britesorb A100) | IPA | 40 | 3.20 |
| Example 7 | IPA | 40 | 5.41 |
| Example 8 | IPA | 40 | 5.00 |
| Blank beer (untreated) | Lager | 0 | 9.97 |
| Silica Hydrogel (Britesorb A100) | Lager | 40 | 6.93 |
| Example 7 | Lager | 40 | 8.21 |
| Example 8 | Lager | 40 | 7.77 |
| Blank beer (untreated) | Lager | 0 | 13.00 |
| Silica Hydrogel (Britesorb A100) | Lager | 40 | 10.51 |
| Example 9 | Lager | 40 | 11.67 |

Stabilizing Testing of Adsorbents

The chill haze removed by the adsorbent is the difference between the chill haze of a blank (untreated) fermented liquid of a given quantity and the chill haze of the same quantity of fermented liquid after processing with the adsorbent. For instance, in Table 7, the chill haze of a blank (untreated) IPA beer was measured as 24.65 NTU and the chill haze of the same IPA beer after treatment with 100 g/mL of Example 4 was measured as 11.95 NTU. Thus, the chill haze removed by the adsorbent of Example 4 was the difference between 24.65 NTU and 11.95 NTU, or 12.7 NTU.

The Stabilizing Power (%) of the novel adsorbent products disclosed herein for fermented liquids may be 40%-100%. The stabilization power of a dosage of adsorbent in a given fermented liquid as compared to the same dosage of Silica Hydrogel (SH) in the same fermented liquid may be determined as a percent of the ratio of the chill haze removed by the adsorbent dosage to the chill haze removed by the same dosage of silica Hydrogel, as shown by the calculation below for Stabilizing Power (%).

$$\text{Stabilizing Power \%} = \frac{(\text{Chill Haze removed by Adsorbent}) \times 100}{\text{Chill Haze removed by Silica Hydrogel}}$$

Beer Stabilizing Testing of Adsorbents

The beer Stabilization Power of a dosage of adsorbent in a given beer as compared to the same dosage of Silica Hydrogel (SH) in the same beer may be determined as a percent of the ratio of the (total) chill haze removed from the beer by the adsorbent dosage to the (total) chill haze removed from the beer by the same dosage of silica Hydrogel, as shown by the calculation below for beer Stabilizing Power (%).

$$\text{beer Stabilizing Power \%} = \frac{(\text{Chill Haze removed by Adsorbent}) \times 100}{\text{Chill Haze removed by Silica Hydrogel}}$$

For example, as discussed above, the chill haze removed by treating the tested IPA with 100 g/mL dosage of Example 4 is calculated to be 12.7 NTU (24.65-11.95 NTU). The chill haze removed in the IPA by 100 g/mL dosage of Silica Hydrogel is calculated as 24.65-9.15 NTU, or 15.5 NTU. Thus the beer Stabilizing Power (%) of the adsorbent of Example 4 for the tested IPA is 12.7/15.5 or about 82%. The beer Stabilizing Power (%) of the novel adsorbent products disclosed herein may be 40%-100%. Table 8 shows the beer Stabilizing Power (%) for exemplary adsorbents of Table 7.

TABLE 8

Beer Stabilizing Power.

| Adsorbent | Beer | Adsorbent Dosage (g/HL) | Beer Stabilizing Power Against Silica Hydrogel (%) |
|---|---|---|---|
| Feed Material A | Pilsner | 100 | 69 |
| Feed Material A | IPA | 100 | 85 |
| Example 1 | IPA | 100 | 56 |
| Example 2 | IPA | 100 | 65 |
| Example 3 | IPA | 100 | 65 |
| Example 4 | IPA | 100 | 82 |
| Example 5 | IPA | 100 | 77 |
| Example 6 | IPA | 100 | 51 |
| Example 7 | IPA | 100 | 92 |
| Example 8 | IPA | 100 | 89 |
| Example 7 | IPA | 40 | 43 |
| Example 8 | IPA | 40 | 54 |
| Example 7 | Lager | 40 | 58 |
| Example 8 | Lager | 40 | 72 |
| Example 9 | Lager | 40 | 53 |

The permeability of the various exemplary adsorbent products disclosed herein may be in the range of less than 0.01 to about 0.6 darcy. For example, Table 9 shows the permeability in water of the products of Examples 1-2, 4 and 7-8 as compared to Feed Material A.

TABLE 9

Permeability of Selected Exemplary Adsorbents.

| Adsorbent | Permeability (Darcy) |
|---|---|
| Feed Material A | <0.01 |
| Example 1 | 0.05 |
| Example 2 | 0.40 |
| Example 4 | <0.01 |
| Example 7 | 0.1 |
| Example 8 | 0.05 |

The exemplary novel adsorbents disclosed may have a pH in water in the range of 6 to about 8. For example, the pH in water of the adsorbent products Examples 1-2 and 7-8 is shown in Table 10. For comparison purposes the pH in water was also measured for each of Feed Materials A and B.

TABLE 10 pH in water.

| Adsorbent | pH in water |
|---|---|
| Feed Material A | 8.5 |
| Feed Material B | 9.7 |
| Example 1 | 7.7 |
| Example 2 | 7.5 |
| Example 7 | 6.5 |
| Example 8 | 6.6 |

The pH of a beer before and after treatment with of various exemplary embodiments was measured. The results may be found in Table 11. As can be seen in the Table 11, the pH of the beer increased only slightly with stabilization using the novel adsorbents disclosed herein.

TABLE 11 pH in Beer.

| | pH in beer |
|---|---|
| Blank beer | 4.1 |
| Example 1 | 4.3 |
| Example 2 | 4.2 |
| Blank beer | 3.8 |
| Example 7 | 4.0 |
| Example 8 | 4.0 |

The novel adsorbent products disclosed herein may have: (a) no more than 1.5 ppm beer soluble iron as measured by the modified ASBC method discussed herein, or 0 to about 1.5 ppm beer soluble iron as measured by the modified ASBC. For example, the concentration of iron in the beer is shown in Table 12 for various exemplary embodiments.

TABLE 12

| Concentration of Beer Soluble Iron. | |
|---|---|
| | Beer Soluble Iron (ppm) |
| Example 10 | 1.30 |
| Example 7 | 1.15 |
| Example 8 | 0.94 |

The novel adsorbent products disclosed herein may have: a $d_{10}$ in the range of 2-8 microns or 4-7 microns; a ids') in the range of 5-19 microns or 10-19 microns; and a $d_{90}$ in the range of 10-70 microns or 20-42 microns. For example, Table 13 shows the particle size distribution of various exemplary embodiments as measured by a laser particle size analyzer. The novel adsorbent products disclosed herein may have: a pore volume in the range of 0.5-1.9 mL/g or 0.7-1.5 mL/g and a porosity in the range of 30-90% or 40-80% or 49-72% or 45-75%. For example, Table 13 shows the pore volume and porosity as measured by mercury intrusion for various exemplary embodiments.

TABLE 13

The Particle Size Distribution.

| Absorbent | d10 (μm) | d50 (μm) | d90 (μm) | Pore volume (mL/g) | Porosity (%) | Surface area ($m^2$/g) |
|---|---|---|---|---|---|---|
| Example 1 | 4.71 | 10.22 | 20.72 | 1.4005 | 72 | 111 |
| Example 2 | 5.38 | 11.01 | 20.92 | 1.3876 | 72 | 109 |
| Example 7 | 6.11 | 18.11 | 41.53 | 0.7119 | 49 | 122 |
| Example 8 | 5.56 | 16.37 | 37.28 | 0.8589 | 58 | 102 |

Figure 4:
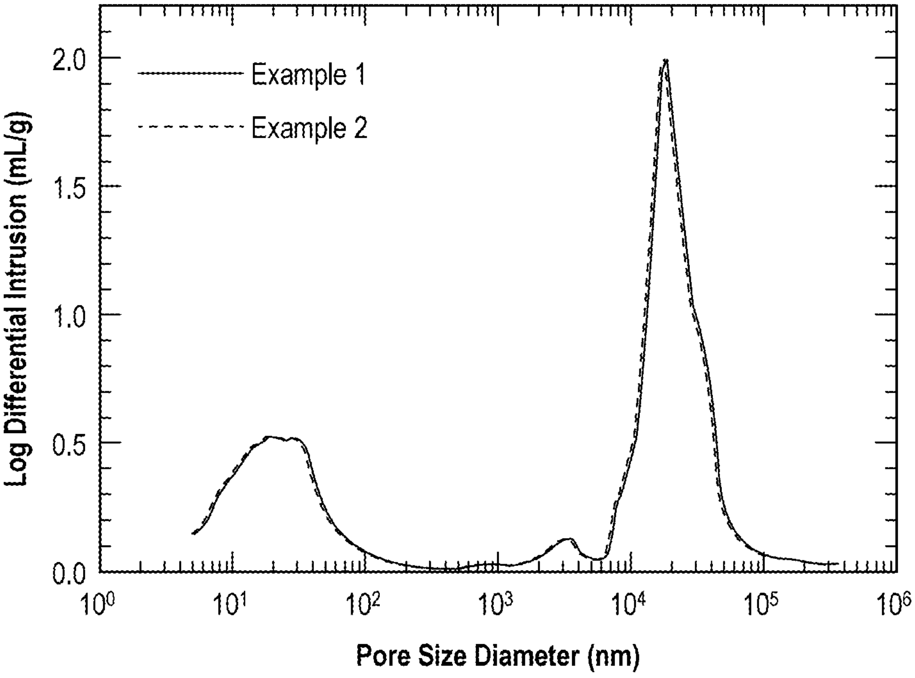
FIG. 4 is pore size distribution of Examples 1 and 2.
Figure 5:
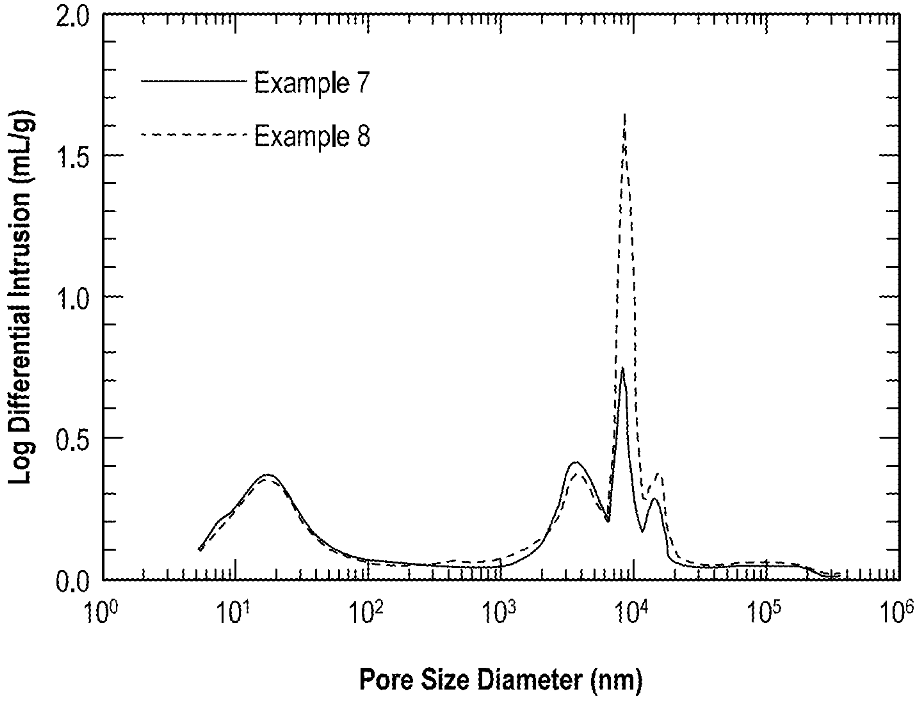
FIG. 5 is pore size distribution of Examples 7 and 8.

FIG. 4 shows the pore size distribution of Examples 1-2 (as measured by mercury intrusion) and FIG. 5 shows the pore size distribution of Examples 7-8 (as measured by mercury intrusion). As used herein, an "intrinsic pore" is a pore that is: (a) disposed in the surface of a particle of attapulgite or sepiolite; or (b) disposed in the structure of a particle of attapulgite or sepiolite. As used herein an "inter pore" is a pore that is: (a) disposed between particles of attapulgite or sepiolite; or (b) disposed between agglomerated particles of attapulgite or sepiolite. The distribution of FIG. 4 shows small intrinsic pores around about 20 nanometers (nm) to about 30 nm, and large inter pores around about 3 microns to about 19 microns with a peak position at about 19 microns for the products of Examples 1-2. The distribution of FIG. 5 shows small intrinsic pores around about 20 nm to about 30 nanometers (nm), and large inter pores at about 3 microns to about 15 microns with peak positions at about 3 microns to about 15 microns for the products of Examples 7-8. In addition, Examples 1-2 have a porosity of about 72% and a total intrusion volume of about 1.3 mL/g to about 1.4 mL/g, which indicates that Examples 1-2 are fairly porous. Examples 7-8 have a porosity of about 49% to about 58% and a total intrusion volume of about 0.7 mL/g to about 0.86 mL/g, which indicates that Examples 7-8 are still fairly porous. The high surface area and unique porous structure of these products make these products effective adsorbents for various applications including protein adsorption.

INDUSTRIAL APPLICABILITY

In general, the foregoing disclosure finds utility in the removal of proteins, which cause chill haze, from fermented liquids (e.g., from beer). As explained earlier, chill haze is generally not desirable for fermented liquids, especially most beers (e.g., lagers and pilsners), since consumers often perceive haziness as a defect and/or undesirable. Chill haze forms when beer or wine or the like is cooled to below 0° C. and, as a result, certain proteins react and agglomerate together. Without treatment, a portion of the chill haze may develop into permanent haze.

Clays such as montmorillonite and bentonite are generally unacceptable for chill proofing processes as they entrap too much of the fermented liquid due to their swelling properties. This results in volume loss of the desired fermented liquid and an increase in disposal cost related to the swelling of the clay with fluid. Treatments used to reduce swelling of these clays may be unacceptable to end users.

Porous silica gels (hydrogels and xerogels) are commonly used in a two-step process to remove proteins responsible for causing haze in beer. These silica gels are added to the unstabilized beer to bind proteins to the highly porous silica structure via a silica gel stabilization reaction. After reaction is completed, the silicate gel particles are then removed by a filtration process. Historically, the slow kinetics for conventional products of silica gels including hydrogel and xerogle and the like make the stabilization and chill haze removal for fermented liquids (e.g., beer) process less efficient and the cost of such conventional products is quite expensive. The production process of synthetic silica gels may also generate a higher carbon footprint.

The novel products disclosed herein may be used as an adsorbent for reducing proteins and the like that cause chill haze in fermented liquids (e.g., beer, wine, cider, vinegar). Such products have high removal efficiency.

Use of the more highly permeable embodiments of the novel products disclosed herein that comprise attapulgite or sepiolite or mixtures thereof may improve chill proofing process efficiency by simplifying traditional two process steps of silica gel stabilization reaction and filtration to remove silica gel particles to one step—simultaneous stabilization and filtration. For example, use of such more highly permeable embodiments in filter paper/filter media, or as body feed, or as mixed with filter aids as body feed during filtering of the fermented liquid (e.g., beer), even at low concentrations, results in a significant shortening of the processing time for such fermented liquids (e.g., beer), which provides for significant efficiency gains for brewers and the like because of the reduction in the stabilization/chill proofing process time. The simplified process reduces cost and complexity. Furthermore, compared to conventional silica gel and diatomite composite products, filtering time using such more highly permeable embodiments as an adsorbent is significantly less. This further reduces cost and increases production throughput.

In other embodiments, the novel products disclosed herein may be used in similar processes as the current more expensive traditional chill-proofing agents (e.g., silica gel) and achieve desired chill proofing at significantly less expense. For example, in one embodiment, the novel products disclosed herein may be added to the maturation tank utilized in the fermentation process and then subsequently filtered out.

Furthermore, the products disclosed herein are non-swelling and do not undesirably entrap the fermented liquids. In addition, the inventor has found that heat treating attapulgite or sepiolite or mixtures thereof between 200-600° C. prevents "earthy" odors from being released into and remaining in fermented liquids that are processed with the novel products herein to reduce chill haze and stabilize. After pH adjustment, the inventors have found that the novel product does not impact acidic note of the beer. In addition, embodiments of the novel products disclosed herein that provide desired chill proofing are based on treated and processed natural mineral, which results in a more economical final product compared to conventional chill-proofing products of synthetic silica gel.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A product for reducing chill haze in a fermented liquid, the product comprising attapulgite or sepiolite, wherein the product or the attapulgite or the sepiolite has a particle size distribution having a $d_{50}$ of 5-19 microns, wherein the product or the attapulgite or the sepiolite has a pore volume of 0.5-1.9 mL/g, wherein the product or the attapulgite or sepiolite has a porosity of 30-90%, wherein the attapulgite comprises particles having an intrinsic pore size in the range of 6-50 nm or the sepiolite comprises particles having an intrinsic pore size in the range of 6-50 nm, and wherein the product has a Stabilizing Power of 40-100% at a loading of 20-200 g of the product per HL of fermented liquid.

2. The product of claim 1, wherein the attapulgite or sepiolite has been treated with acetic acid and wherein the product has a pH in water of 6-8 measured in a 2 wt. % slurry.

3. The product of claim 1, wherein the fermented liquid is beer and the product has no more than 1.5 ppm beer soluble iron, as measured by the modified ASBC method.

4. The product of claim 1, wherein the fermented liquid is beer and the product has a beer Stabilizing Power of 40-100% at a loading of 35-100 g of the product per HL of beer.

5. The product of claim 4, wherein the product or the attapulgite or the sepiolite has a surface area in the range of 90-150 $m^2/g$ as measured using the BET method.

6. The product of claim 1, wherein the fermented liquid is beer, wine, cider or vinegar, and wherein the product is free of a composite material that includes: (a) attapulgite agglomerated to a first material that is not attapulgite or sepiolite or (b) sepiolite agglomerated to the first material that is not attapulgite or sepiolite.

7. The product of claim 1, wherein the fermented liquid is beer, wherein the beer is an IPA, Lager or Pilsner.

8. The product of claim 1, wherein the product has a ratio of $Al_2O_3$ to $SiO_2$ in the range of 0.17-0.22, wherein the product has a ratio of MgO to $SiO_2$ in the range of 0.12-0.16, and the product has a ratio of MgO to $Al_2O_3$ in the range of 0.75-0.85.

9. A method for reducing chill haze in a fermented liquid, the fermented liquid including beer, wine, cider or vinegar, the method comprising:

contacting or mixing the fermented liquid with a product comprising heat treated attapulgite or heat treated sepiolite; and recovering the product from the fermented liquid to obtain a resultant fermented liquid that has a lower chill haze or has a lower amount of protein and/or polyphenol than the fermented liquid had prior to the contacting or mixing, wherein the product has a Stabilizing Power of 40-100% at a loading of 20-200 g of the product per HL of fermented liquid, wherein the heat treated attapulgite comprises particles having an intrinsic pore size in the range of 6-50 nm or the heat treated sepiolite comprises particles having an intrinsic pore size in the range of 6-50 nm, wherein the product or the heat treated attapulgite or the heat treated sepiolite has a particle size distribution having a $d_{50}$ of 5-19 microns, wherein the product or the heat treated attapulgite or the heat treated sepiolite has a pore volume of 0.5-1.9 mL/g, and wherein the product or the heat treated attapulgite or heat treated sepiolite has a porosity of 30-90%.

10. The method of claim 9, wherein the fermented liquid is beer, wherein the beer is an IPA, Lager or Pilsner, and wherein the product has a beer Stabilizing Power of 40-100% at a loading of 35-100 g of the product per HL of beer.

11. The method of claim 10, wherein the product has a pH of 6-8, as measured in a 2 wt. % water slurry, and wherein the product has no more than 1.5 ppm beer soluble iron, as measured by the modified ASBC method.

12. The method of claim 10, wherein the product has a permeability of 0.1-1 darcy in water, wherein the product is free of a composite material that includes: (a) attapulgite agglomerated to a first material that is not attapulgite or sepiolite or (b) sepiolite agglomerated to the first material that is not attapulgite or sepiolite, wherein the product has a ratio of $Al_2O_3$ to $SiO_2$ in the range of 0.17-0.22, wherein the product has a ratio of MgO to $SiO_2$ in the range of 0.12-0.16, and the product has a ratio of MgO to $Al_2O_3$ in the range of 0.75-0.85.

13. The product of claim 1, wherein the pore volume is 0.7-1.5 mL/g.

14. The product of claim 1, wherein the attapulgite comprises particles having the intrinsic pore size in the range of 20-30 nm or the sepiolite comprises particles having the intrinsic pore size in the range of 20-30 nm.

15. The method of claim 9, wherein the pore volume is 0.7-1.5 mL/g.

16. The method of claim 9, wherein the heat treated attapulgite comprises particles having the intrinsic pore size in the range of 20-30 nm or the heat treated sepiolite comprises particles having the intrinsic pore size in the range of 20-30 nm.

* * * * *